United States Patent [19]

Law et al.

[11] 4,348,037

[45] Sep. 7, 1982

[54] SAFETY CUSHION ATTACHABLE TO BELT-TYPE RESTRAINTS

[75] Inventors: Bliss W. Law; George F. Kirchoff; Gary V. Adams, all of Brigham City, Utah

[73] Assignee: Thiokol Corporation, Newtown, Pa.

[21] Appl. No.: 152,922

[22] Filed: Jun. 3, 1980

[51] Int. Cl.³ .............................................. B60R 21/10
[52] U.S. Cl. ................................ 280/733; 244/122 B; 280/743; 280/808; 297/468; 297/483
[58] Field of Search ............... 280/733, 730, 729, 728, 280/743, 801, 802, 805, 808, 731, 732; 244/122 B, 122 R; 180/268; 297/468, 469, 470, 471, 483, 488

[56] References Cited

U.S. PATENT DOCUMENTS

| | | | |
|---|---|---|---|
| 2,859,048 | 11/1958 | Munn | 280/733 |
| 3,241,881 | 3/1966 | Carnahan et al. | 297/468 |
| 3,706,462 | 12/1972 | Lilly | 280/733 |
| 3,720,445 | 3/1973 | Bennett | 297/488 |
| 3,756,617 | 9/1973 | Brown | 280/732 |
| 3,801,156 | 4/1974 | Granig | 280/733 |
| 3,841,654 | 10/1974 | Lewis | 280/733 |
| 3,865,398 | 2/1975 | Woll | 280/733 |
| 3,866,940 | 2/1975 | Lewis | 280/733 |
| 3,933,370 | 1/1976 | Abe et al. | 280/733 |
| 3,948,541 | 4/1976 | Schulman | 280/733 |

*Primary Examiner*—Joseph F. Peters, Jr.
*Assistant Examiner*—Milton L. Smith
*Attorney, Agent, or Firm*—Gerald K. White

[57] ABSTRACT

A safety cushion apparatus having a very short reaction time is attachable to automotive vehicle belt-type restraints for softening the shock of sudden constraint against the user's body and to maintain the belt restraints with an appropriate degree of tautness. The apparatus includes an inflatable cushion that is longitudinally folded to a compact, strap-like configuration conforming to the shape of the belt restraint, a flat, slim inflator being enclosed within and surrounded by the folded cushion. The folded cushion is releasably enclosed within an outer cover to which it is attached, the outer cover being attached to the underside of the belt restraint and fastened over the folded cushion by a long zipper. Velcro hook and hoop fastening material is utilized for attaching the cover to the belt restraint and the zipper. The inflator is actuatable by a crash impact sensor mounted on the vehicle and is operable to generate an innocuous gas for inflating the cushion, the cover being automatically opened upon such inflation of the cushion.

8 Claims, 6 Drawing Figures

SAFETY CUSHION ATTACHABLE TO BELT-TYPE RESTRAINTS

The Government has rights in this invention pursuant to Contract No. N62269-77-C-0025 awarded by the U.S. Navy Department.

BACKGROUND OF THE INVENTION

1. Field of the Invention

This invention relates to restraints that are used to provide protection for occupants of vehicles, and more particularly, to an inflatable safety cushion apparatus that is attachable to passive belt-type restraints.

2. Description of the Prior Art

Various forms of restraints have been proposed in the prior art for the protection of vehicle occupants. Specifically, there have been provided passive and inflatable seat belt systems, and static and inflatable air bag systems. Inflatable belt and inflatable air bag systems are designed to provide a greater degree of protection, than the passive seat belt and static air bag systems are capable of, for the vehicle occupants.

The inflatable restraint systems of the prior art are complex and expensive, and are characterized by their longer than desirable "reaction time," that is the length of time required for inflation and effective constraining action on the user upon a crash impact. Additionally, the prior art inflatable restraint systems are best suited for installation at the time of manufacture of the vehicle. Among the reasons for this is that the inflatable belt systems require, in addition to the use of a special inflatable belt, the mounting in the vehicle, on or under the floor thereof, of a pressurized gas supply that is connected to the inflatable belt by an elongated tube or pipe. The inflatable air bag systems involve mounting in the steering wheel hub and/or in the dashboard of the vehicle of a folded and compacted air bag that is inflatable to a relatively large volume, and a pressurized gas supply or gas generator.

With the inflatable belt-type restraint systems, an undesirable delay in the inflation of the inflatable belt is introduced because the gas must flow through the elongated tube from the pressurized gas supply. This extends the reaction time of the system beyond a value that is optimum for protection of the user in the most comfortable manner. The relatively larger volume of the air bag, and the relatively large distance between the folded and compacted bag and the user that must be traversed by the inflated bag, upon a crash impact, to constrain the user also cause the reaction time of the inflatable air bag restraint systems to be longer than desirable. As a consequence, for both the inflatable belt and the inflatable air bag restraint systems of the prior art, the longer than desirable reaction time upon a crash impact tends to allow some movement of the user to occur, thus exposing the user to an undesirable shock of sudden, hard constraint.

There thus exists a need in the art for an improved restraint for the protection of occupants of vehicles that functions, upon a crash impact, to soften the shock of sudden constraint against the user's body, and to maintain the restraint with an appropriate degree of tautness.

There further exists a need in the art for a simple and facile way to improve passive belt-type restraint systems that are already installed on vehicles to provide such greater degree of protection with a minimum of discomfort for the occupants of vehicles having such restraint systems.

SUMMARY OF THE INVENTION

Among the objectives of the invention is to provide an improved inflatable restraint for the protection of vehicle occupants.

A specific object of the invention is to provide such an improved restraint that functions, upon a crash impact, to soften the shock of sudden constraint against the body of the user, and to maintain the restraint with an appropriate degree of tautness.

Another specific object of the invention is to provide such an improved restraint comprising an inflatable safety cushion apparatus that is easily attachable to passive belt-type restraints that already are installed in automotive vehicles.

To these ends there is provided, according to the invention, an inflatable safety cushion apparatus that is easily attachable to the underside, that is, the side adjacent the vehicle occupant to be protected, of a passive belt-type restraint such as an automotive shoulder and/or seat belt. The safety cushion is longitudinally folded to a compact strap-like configuration that conforms to the shape of the belt-type restraint. A releasable outer roughly tubular cover of suitable material is provided to enclose the safety cushion while in its folded condition. An intermediate portion of the cover is attached to the inflatable cushion and to the underside of the belt-type restraint by suitable means. One means for such attachment is by sewing. Hook and loop fastener material, sold commercially under the trademark VELCRO and disclosed in U.S. Pat. Nos. 2,717,437, 3,000,384, 3,009,235, 3,076,244, 3,130,111, 3,147,528, 3,154,837, 3,192,589, and 3,387,345, also advantageously may be used for this purpose. Such fastener material provides a means for the ready attachment to and detachment from the belt-type restraint of the safety cushion. The cover is fastened over the longitudinally folded cushion with a long zipper of suitable readily releasable means. VELCRO material also is suitable for this purpose. Upon expansion of the inflatable cushion, the cover is automatically opened to allow the cushion to inflate rapidly.

A gas supply for inflating the safety cushion with an innocuous gas such as nitrogen, is suitably enclosed within the folded cushion. This gas supply comprises a gas generator or inflator of the solid fuel type such as that disclosed in the commonly owned and copending application for patent of Gary V. Adams and Fred E. Schneiter bearing Ser. No. 152,921 filed on even date herewith. The inflator is attached to suitable sensor apparatus that detects and responds to crash impacts of the vehicle in which it is installed. In order to achieve a desirable compactness, and in particular, a flat, slim configuration, the inflator has dual chambers that are filled with gas generant material that is ignitable by a central igniter. The inflator contains appropriate filters and cooling means, and is capable of inflating the safety cushion within about 15 milliseconds. Such rapid inflation of the safety cushion apparatus contributes importantly to the attainment of a desirably short reaction time.

The safety cushion apparatus functions, when inflated, to effect a desirable distribution of the load so as to soften the shock of sudden constraint against the body of the user, and further, to maintain the belt restraint with an appropriate degree of tautness. That is to say, the safety cushion functions to take up any slack in the belt-type restraint to which it is attached thereby preventing violent forward thrust of the user's body, and by virtue of a leakage, by design, of gas therefrom through the seams thereof simultaneously with the rush of inflating gas therein, distributes in a soft, shock absorbing manner, the constraining action of the belt-type restraint against the user's body, and maintains the belt restraint with an appropriate degree of tautness.

DESCRIPTION OF THE PREFERRED EMBODIMENT

Figure 1:
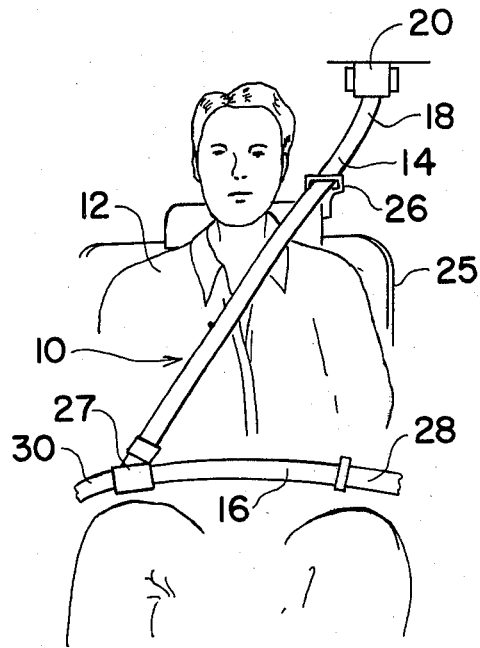
FIG. 1 is a front view illustrating the safety cushion apparatus of the present invention attached, in a compacted and folded condition, to a passive vehicle belt-type restraint having shoulder and seat belts, said restraint being indicated as installed in a vehicle and placed over the shoulder and lap of an occupant seated in the vehicle.
Figure 4:
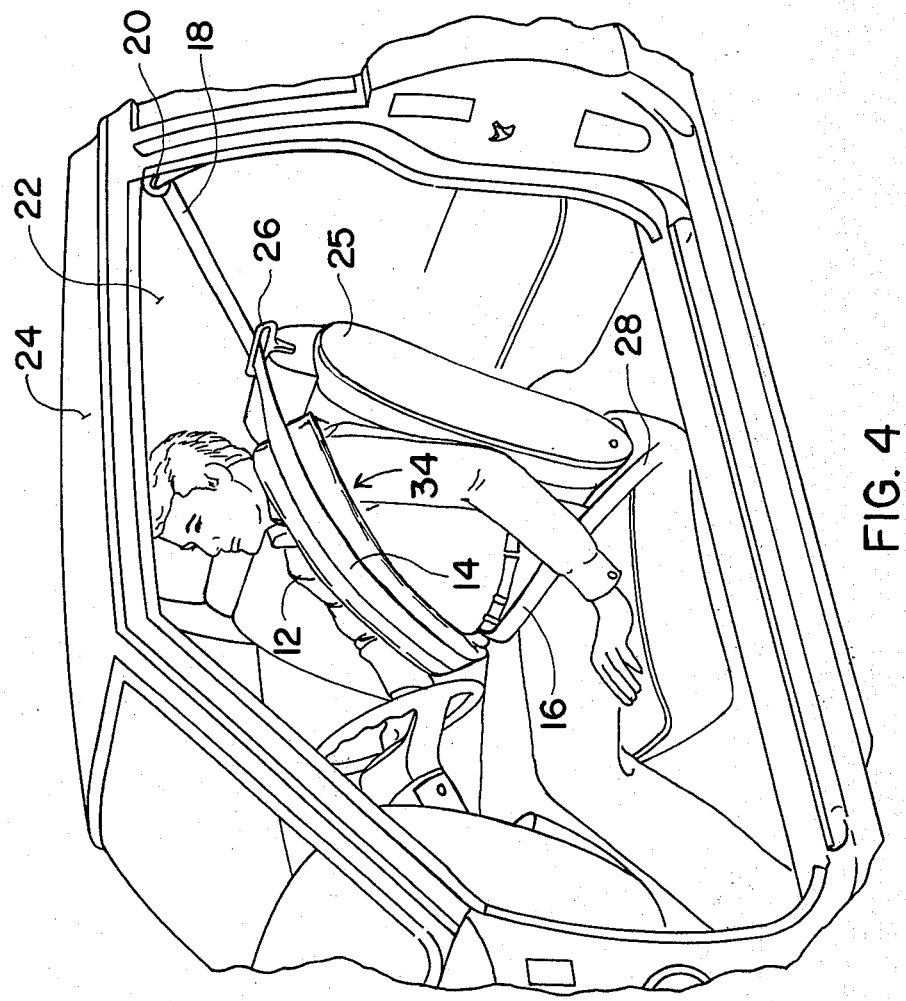
FIG. 4 is a side view of the apparatus illustrated in FIG. 1 showing further details of the vehicle and showing the safety cushion inflated to constrain the body of the vehicle occupant.

In FIGS. 1 and 4 of the drawings there is shown a belt-type restraint 10 for a vehicle occupant indicated at 12, the restraint 10 including a shoulder strap or belt 14 and a transversely positioned seat belt or lap strap 16, belts 14 and 16 being made of suitable material such as woven cloth. The shoulder belt 14 is suitably secured at its upper end 18 to an inner, upper side wall 20 of a compartment 22 of an automotive vehicle 24 having a seat 25 in which the occupant 12 is seated, and is used for constraining the body portion of the occupant 12. Desirably, an intermediate guiding loop 26 for shoulder belt 14 is provided on the back of the vehicle seat 25, as illustrated in FIG. 4. The lower end of the shoulder belt 14 is detachably secured by suitable lock means 27 to an intermediate portion of the seat belt 16. One end indicated at 28 of the seat belt 16 is suitably secured, by suitable means (not shown), to an inner, lower side wall (not shown) of the vehicle compartment 22, and the other end indicated at 30 of the lap belt 16 is detachably secured by suitable means (not shown) to the floor of the compartment 22, at an intermediate position therein.

The shoulder belt 14 and the seat belt 16, per se, and their manner of attachment to vehicle 24, form no part of the present invention. Therefore, they will not be further described herein except to note that they may be of conventional passive type. If desired, the belts 14 and 16 may be employed in conjunction with a suitable drive mechanism, as is known in the prior art and disclosed, for example, in U.S. Pat. No. 4,072,323, for automatically bringing the shoulder and seat belts in tightening and releasing positions, respectively, for the vehicle occupant upon the opening and closing of the adjacent door (not shown) of the vehicle.

Figure 3A:
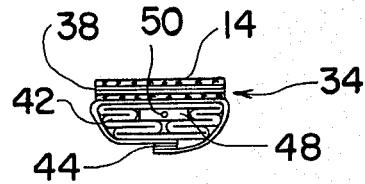
FIG. 3A is a cross section taken along the line 3A—3A of FIG. 2 showing the inflatable cushion in its compacted and folded condition and with the cover therefor in its closed position, the depth of the folded cushion being exaggerated to enable clarifying detail.
Figure 3B:
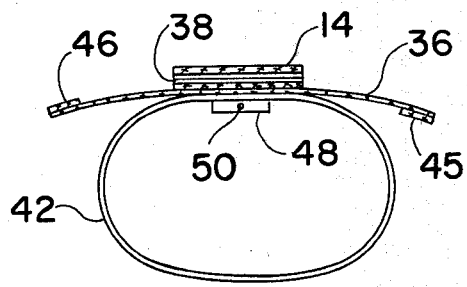
FIG. 3B is a cross section view similar to FIG. 3A but showing the inflatable cushion in its unfolded and inflated condition and the cover therefor opened.
Figure 2:
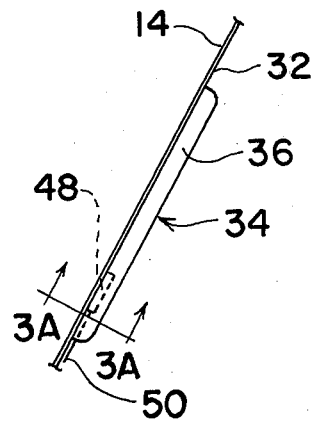
FIG. 2 is a side elevation of the shoulder belt portion of the safety cushion apparatus of FIG. 1.
Figure 3C:
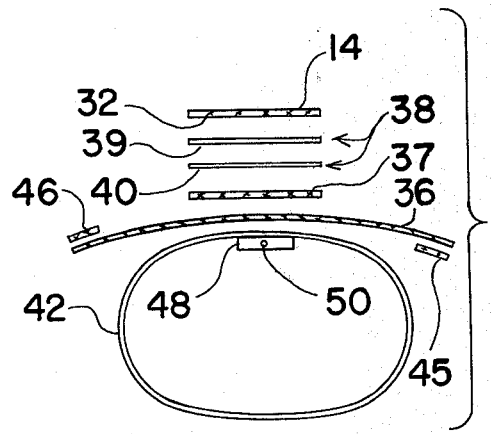
FIG. 3C is an exploded cross sectional view similar to FIG. 3B but showing in more detail the several component parts of the safety cushion apparatus.

As shown in FIG. 2 of the drawings, there is attached to the underside 32 of the shoulder belt 14, that is the side thereof adjacent the body of the occupant 12, a safety cushion apparatus indicated generally at 34 and shown as provided with an outer cover 36 which is attached thereto, as by sewing. The outer cover 36 is roughly tubular in form, as shown in FIGS. 3A, 3B and 3C, has an elongated strip of webbing 37 attached at the outer surface thereof, as by sewing. The webbing 37 is disposed longitudinally of the cover 36, intermediate the width thereof. The attachment of the cushion 34 and cover 36 to the belt 14 is by suitable means such as VELCRO hook and loop fastener material indicated at 38 and having components attached to the webbing 37 and the underside 32 of belt 14, whereby the cushion 34 is readily attachable to, and if desired, detachable from, the belt 14. Thus, a first component 39 of the VELCRO material 38 is attached to the belt 14 as by sewing, by means of a suitable adhesive, or other suitable means, and a cooperating component 40 thereof is attached to the adjacent side of the webbing 37.

The safety cushion 34 further includes an elongated inner inflatable cushion 42 that is attached along its length as by sewing, the use of a suitable adhesive, or other suitable means, to the inner surface of cover 36, the position of attachment to cover 36 being intermediate the width thereof. Inflatable cushion 42, when collapsed, is longitudinally compacted and folded within the cover 36, the longitudinally compacted cushion being held in the collapsed condition by vacuum, if desired. The cover 36 is fastened over the folded cushion 42 with a long zipper 44. Desirably, the zipper 44 comprises cooperating VELCRO components 45 and 46, as shown in FIGS. 3B and 3C.

An inflator indicated at 48 is enfolded within and completely surrounded by the compacted and folded cushion 42, being fixedly attached as by a suitable adhesive, riveting, or other suitable means to the cushion 42, internally thereof, adjacent and proximate to the position of attachment of the cushion 42 to the outer cover 36. The inflator 48 desirably has a flat, slim configuration, as shown, and is of the solid fuel type, as mentioned hereinbefore, that when actuated, generates at a very rapid rate an innocuous gas such as nitrogen. The inflator 48 includes electric terminals or wires 50 that extend through the wall of cushion 42, being sealed therein, and are electrically connected by means not shown to an electrical circuit that includes a suitable sensor (not shown) that is mounted in the vehicle 24, in a manner known in the art. The sensor detects, and by way of the associated electrical circuit, provides an actuating electrical command signal for igniting the inflator 48 in response to crash impacts of a vehicle from a speed, typically, of 12-15 miles per hour. It is noted that in addition to arising from violent retardation, crash impacts may also result from sudden acceleration, compression and/or twisting of the vehicle. With the use of a suitable sensor, protection of vehicle occupants against such impacts is also provided, according to the present invention.

When the inflatable cushion 42 is inflated, the cover 36 is automatically opened, as illustrated diagrammatically in FIGS. 3B and 4. While normally effective to hold the cover 36 closed about the longitudinally compacted and folded inflatable cushion 42, the VELCRO hook and loop fastener components 45 and 46 readily give way and, upon actuation of inflator 48 by the associated crash impact sensor, the cushion 42 is allowed to expand rapidly to its inflated condition. Since the inflator 48 is mounted within the inflatable cushion 42, there are no tubes or other flow restricting flow paths through which the inflating gases must flow to inflate cushion 42, and as a result, inflation thereof is extremely rapid, being about 15 milliseconds. As a result, the reaction time for inflation of cushion 42 upon a crash impact is about 20-25 milliseconds.

It will be understood that, if desired, a safety cushion apparatus such as cushion 34 may be attached to the seat belt or lap strap 16 as well as to the shoulder belt 14, such attachment being effected in a similar manner by the use of VELCRO fastener material. It will also be understood that, if desired, the cushion 42 may be so shaped, when in its inflated condition, as to protect the chin and to keep the head from thrusting forward or going to the side upon a crash impact.

Desirably, the inflatable cushion 42 is made of neoprene coated rib stock nylon sheet, the seams of which are suitably sewed and sealed with silicone rubber. The cushion 42 is characterized in that as inflating gas from inflator 48 rushes in during inflation thereof, there is leakage therefrom through the seams at a rate such that any tendency for the surface of the cushion 42 to become hard and unyielding to the body of the user is inhibited. The effect upon the body of the user is to soften or cushion the impact of a crash, thus protecting the body of the user, during a crash, from the shock of what otherwise could be a hard, unyielding and possibly injurious constraint. As the supply of gas from the inflator 48 diminishes, and the leakage through the seams diminishes, the volume of gas within cushion 42 becomes depleted and cushion 42 collapses.

Because of the inclusion of appropriate filters and cooling means in the inflator 48, there is little or no exposure of the vehicle occupant 12 to noxious gases or to particulate matter that might tend to escape from the cushion 34 upon inflation thereof in response to a vehicle crash impact, nor is there exposure of the occupant 12 to temperatures that might be uncomfortably high or harmful.

Thus, there has been provided, according to the present invention, an improvement to inflatable safety restraint apparatus that functions to so distribute the load over the body portion and the lap portion, also, if desired, of vehicle occupants as to provide vehicle occupants a greater degree of protection with significantly less discomfort than that provided by the inflatable restraints of the prior art.

The safety cushion apparatus of the present invention is characterized in that it functions to soften the shock of sudden constraint against the body of the user, and to maintain the belt restraint with an appropriate degree of tautness. With safety cushion apparatus deployed according to the present invention, upon a vehicle crash and inflation of the associated safety cushion, the vehicle occupants are quickly constrained in their seats and held with relatively little discomfort against violent movements within the vehicle that tend to result from the crash. Thus, with the first rapid rush of gas into the inflatable cushion 42 which would tend to present a hard, unyielding and possibly injurious surface to the vehicle occupant, leakage of gas through the seams of the cushion 42 occurs, thus softening the cushion surface and the shock of sudden constraint against the body of the occupant while effecting a desirable distribution of the load and simultaneously maintaining the belt 16 taut to an appropriate degree.

The very rapid rate of inflation of the safety cushion and consequent extremely short reaction time of 20-25 milliseconds, as mentioned hereinbefore, upon a crash impact, has been found to be sufficiently fast with respect to the inertia of the body of the user that the body of the user is restrained in a shock absorbing manner before there has been any significant body movement. This effectively overcomes an initial tendency, upon a crash impact, for inflatable belt-type restraints to present a hard, unyielding, uncomfortable, and possibly injurious surface to the body of the user.

What is claimed is:

1. Safety cushion apparatus attachable to belt-type restraints for protecting vehicle occupants including,
    an elongated inflatable cushion folded and compacted to conform to the shape of a belt-type restraint to which it is to be attached, and
    releasable means to fasten said folded and compacted inflatable cushion to the belt-type restraint in conforming relationship therewith and for support thereby,
    wherein the material of which the inflatable cushion is made is selected to allow leakage of gas from the interior thereof thereby to impede hardening of the exterior surface of said inflatable cushion upon inflation thereof, and
    wherein said inflatable cushion is made of neoprene coated rib stock nylon sheet and includes seams that are sealed with silicone rubber, said seams providing said leakage.

2. Safety cushion apparatus attachable to belt-type restraints for protecting vehicle occupants including,
    an elongated inflatable cushion folded and compacted to conform to the shape of a belt-type restraint to which it is to be attached,
    releasable means to fasten said folded and compacted inflatable cushion to the belt-type restraint in conforming relationship therewith and for support thereby, and
    a tubular cover to enclose said folded and compacted inflatable cushion, said cover including longitudinally disposed releasable means to allow opening thereof and expansion of said inflatable cushion upon inflation thereof,
    wherein said cover and inflatable cushion are fixedly attached along longitudinal contiguous surfaces with flap portions of said cover extending to opposite sides of said cushion, and
    wherein said releasable means to allow opening of said cover comprises hook and loop fastening means having a first component attached to one flap portion of said cover and a second component attached to the other flap portion thereof.

3. Safety cushion apparatus as specified in claim 2 including an elongated strip of webbing that is attached to said cover exterior thereof proximate said longitudinal contiguous surfaces of said cover and said inflatable cushion, and wherein said releasable means to fasten said cushion to the belt-type restraint comprises hook and loop fastening means having a first component attached to the belt-type restraint and a second component attached to said webbing.

4. Safety cushion apparatus attachable to belt-type restraints for protecting vehicle occupants including, an elongated inflatable cushion folded and compacted to conform to the shape of a belt-type restraint to which it is to be attached, releasable means to fasten said folded and compacted inflatable cushion to the belt-type restraint in conforming relationship therewith and for support thereby, a gas generator positioned internally of said inflatable cushion, wherein said gas generator is attached to said inflatable cushion at a position such that support therefor is directly provided by the belt-type restraint, and a tubular cover to enclose said folded and compacted inflatable cushion, said cover including longitudinally disposed releasable means to allow opening thereof and expansion of said inflatable cushion upon inflation thereof, said cover and inflatable cushion being fixedly attached along longitudinal contiguous surfaces with flap portions of said cover extending to opposite sides of said cushion, and wherein said releasable means to allow opening of said cover comprises hook and loop fastening means having a first component attached to one flap portion of said cover and a second component attached to the other flap portion thereof.

5. Safety cushion apparatus as specified in claim 4 including an elongated strip of webbing that is attached to said cover exterior thereof proximate said longitudinal contiguous surfaces of said cover and said inflatable cushion, and wherein said releasable means to fasten said cushion to the belt-type restraint comprises hook and loop fastening means having a first component of said hook and loop attached to the belt-type restraint and a second component attached to said webbing.

6. Safety cushion apparatus as specified in claim 5 wherein said gas generator is attached to said inflatable cushion at a position therein proximate said longitudinal contiguous surfaces of said cover and inflatable cushion whereby said gas generator is supported by said cover, said webbing, said hook and loop fastening means and the belt-type restraint.

7. Safety cushion apparatus as specified in claim 6 wherein said inflatable cushion is made of neoprene coated rib stock nylon sheet and includes seams that are sealed with silicone rubber, said seams allowing leakage of gas from the interior of said inflatable cushion upon actuation of said gas generator and the generation of gas thereby, whereby hardening of the exterior surface of the inflatable cushion, upon inflation thereof, is precluded and said surface is effective to soften, for the vehicle occupant, the shock of the sudden impact of a crash and to maintain the belt-type restraint with an appropriate degree of tautness.

8. Safety cushion apparatus attachable to belt-type restraints for protecting vehicle occupants including, an elongated inflatable cushion folded and compacted to conform to the shape of a belt-type restraint to which it is to be attached, releasable means to fasten said folded and compacted inflatable cushion to the belt-type restraint in conforming relationship therewith and for support thereby, and a gas generator positioned internally of said inflatable cushion, wherein said gas generator is attached to said inflatable cushion at a position therein such that the belt-type restraint provides support directly therefor, wherein said releasable means comprises hook and loop fastening means having a first component attached to the side of the belt-type restraint that is nearest to the body of the vehicle occupant to be protected and a second component attached to said inflatable cushion, wherein said inflatable cushion is made of neoprene coated rib nylon sheet and includes seams that are sealed with silicone rubber, leakage through said seams of gas from the interior of said cushion upon actuation of said gas generator and the generation of gas thereby being such that hardening of the exterior surface of said inflatable cushion upon inflation thereof is impeded and said cushion is effective to soften, for the vehicle occupant, the shock of the sudden impact of a crash and to maintain the belt-type restraint with an appropriate degree of tautness.

* * * * *